United States Patent [19]
Gilbert et al.

[11] Patent Number: 5,521,001
[45] Date of Patent: May 28, 1996

[54] CARBIDE FORMED ON A CARBON SUBSTRATE

[75] Inventors: Thomas R. Gilbert, Norfolk, Mass.; Rajiv S. Soman, Fairfield, Ohio; Jiaxiang Li, Malden, Mass.

[73] Assignee: Northeastern University, Boston, Mass.

[21] Appl. No.: 242,804

[22] Filed: May 13, 1994

Related U.S. Application Data

[60] Continuation of Ser. No. 907,146, Jul. 1, 1992, abandoned, which is a division of Ser. No. 667,198, Mar. 11, 1991, Pat. No. 5,141,773, which is a continuation-in-part of Ser. No. 610,844, Nov. 5, 1990, abandoned.

[51] Int. Cl.$^6$ ............................................. B32B 3/06
[52] U.S. Cl. ............................ 428/306.6; 428/318.4; 428/62; 428/85; 428/440
[58] Field of Search ................ 428/306.6, 318.4, 428/408; 423/440, 62, 85; 427/228, 372.2

[56] References Cited

U.S. PATENT DOCUMENTS

| | | | |
|---|---|---|---|
| Re. 28,485 | 7/1975 | Rix et al. | 427/228 |
| 3,342,627 | 9/1967 | Paxton et al. | 427/113 |
| 3,356,525 | 12/1967 | Gutzeit | 117/46 |
| 3,644,135 | 2/1972 | Speyer | 423/440 |
| 3,778,301 | 12/1973 | Wohlberg | 427/228 |
| 3,854,991 | 12/1974 | Hale | 428/336 |
| 3,874,900 | 4/1975 | Post et al. | 117/69 |
| 3,901,663 | 8/1975 | Hofmann et al. | 29/195 |
| 3,903,347 | 9/1975 | Galasso et al. | 428/366 |
| 3,975,557 | 8/1976 | Kuchek | 427/126 |
| 4,080,508 | 3/1978 | Greenewald, Jr. | 13/7 |
| 4,104,417 | 8/1978 | Sara | 427/37 |
| 4,237,193 | 12/1980 | Jackson et al. | 428/678 |
| 4,252,856 | 2/1981 | Sara | 428/408 |
| 4,264,682 | 4/1981 | Fuyama et al. | 428/336 |
| 4,268,569 | 5/1981 | Hale | 428/215 |
| 4,275,095 | 6/1981 | Warren | 427/228 |
| 4,287,259 | 9/1981 | Riley | 428/408 |
| 4,343,836 | 8/1982 | Newkirk et al. | 427/249 |
| 4,347,083 | 8/1982 | Sara | 75/204 |
| 4,358,506 | 11/1982 | Intrater et al. | 428/408 |
| 4,396,677 | 8/1983 | Intrater | 428/408 |
| 4,397,901 | 8/1983 | Warren | 428/101 |
| 4,440,581 | 4/1984 | Baudis et al. | 148/6.11 |
| 4,446,169 | 5/1984 | Castle et al. | 427/53.1 |
| 4,453,987 | 6/1984 | Arai et al. | 148/15.5 |
| 4,471,023 | 9/1984 | Shuford | 428/408 |
| 4,500,602 | 2/1985 | Patten et al. | 428/408 |
| 4,560,589 | 12/1985 | Endou et al. | 427/249 |
| 4,585,675 | 4/1986 | Shuford | 427/376.2 |
| 4,594,294 | 6/1986 | Eichen et al. | 428/552 |
| 4,610,896 | 9/1986 | Veltri et al. | 427/140 |
| 4,657,825 | 4/1987 | Kanda et al. | 428/627 |
| 4,666,736 | 5/1987 | Matsumura et al. | 427/52 |
| 4,671,997 | 6/1987 | Galasso et al. | 428/408 |
| 4,686,156 | 8/1987 | Baldoni et al. | 428/698 |
| 4,726,099 | 2/1988 | Card et al. | 29/25 |
| 4,852,453 | 8/1989 | Morin | 89/1.11 |
| 4,889,686 | 12/1989 | Singh et al. | 419/13 |
| 5,141,773 | 8/1992 | Gilbert et al. | 427/228 |

FOREIGN PATENT DOCUMENTS

| | | |
|---|---|---|
| 103848 | 5/1974 | Japan . |
| 36585 | 2/1977 | Japan . |
| 56-145180 | 10/1980 | Japan . |

OTHER PUBLICATIONS

"Analysis of Petroleum for Trace Metals—A Method for Improving Detection Limites for Some Elements with the Graphite Furnace Atomizer," by John H. Runnels, et al., Analytical Chemistry, vol. 47, No. 8, Jul. 1975.

"Carbide–Treated Graphite Cuvettes for Electrothermal Atomization Prepared by Impregnation with Metal Chlorides," by Manuel C. Almeida, et al., Applied Spectroscopy, vol. 40, No. 1, 1986.

*Primary Examiner*—Christopher W. Raimund
*Attorney, Agent, or Firm*—Weingarten, Schurgin, Gagnebin & Hayes

[57] ABSTRACT

A carbide phase on a porous or impervious carbon substrate is provided by chemically reacting the substrate with a concentrated solution of a carbide forming element in compound dissolved in a suitable solvent. The carbon substrate is heated to a temperature at which the compound decomposes and chemically reacts with the carbon substrate to form the desired carbide phase.

10 Claims, No Drawings

5,521,001

CARBIDE FORMED ON A CARBON SUBSTRATE

RELATED APPLICATION

This application is a continuation of application Ser. No. 07/907,146, filed Jul. 1, 1992, now abandoned, which is a division of application Ser. No. 07/667,198, filed on Mar. 11, 1991, now U.S. Pat. No. 5,141,773, issued on Aug. 25, 1992, which is a continuation-in-part of application Ser. No. 07/610,844, filed on Nov. 5, 1990, now abandoned. This application is related to application Ser. No. 07/672,378, filed on Mar. 20, 1991, now U.S. Pat. No. 5,238,711, which is a continuation-in-part of application Ser. No. 07/610,844, filed on Nov. 5, 1990, now abandoned.

FIELD OF THE INVENTION

The present invention relates to forming carbide on substrates, particularly to a process for forming carbide on porous or impervious carbon substrates.

BACKGROUND OF THE INVENTION

Carbide coatings on-carbon substrates are typically prepared by chemical vapor deposition (CVD). Generally, halide vapors of the carbide forming element are thermally decomposed at the substrate surface and reacted with a gas mixture. The gas mixture typically contains a volatile compound of the carbide precursor, such as methane, which acts as the source of carbon for the carbide layer, hydrogen, and an inert carrier gas such as argon. CVD yields a complete layer of uniform thickness of carbide over the carbon, however, there is minimal binding between the carbide coating and the carbon substrate. Consequently, differences in coefficients of thermal expansion of the carbide and carbon may result in the carbide coating peeling away from the substrate when the coated substrate is repeatedly cycled between high and low temperatures.

Furthermore, chemical vapor deposition of carbide coatings on carbon substrates must be performed using expensive and elaborate equipment such as ovens or induction furnaces operated at reduced pressures.

Other methods are known for reacting carbide forming elements in solution with porous graphite materials so as to fill up the porous graphite structures with carbides to create an impervious carbide structure. Carbide-treated graphite cuvettes for use as spectroscopic graphite electrodes to electrothermally vaporize samples in atomic absorption spectrophotometry have been prepared by impregnating porous carbon with metal chlorides.

As described by Almeida and Seitz in Applied Spectroscopy, 40(1), 4–8, 1986, porous graphite was impregnated with metal chloride by immersing the porous graphite in liquid metal chlorides under vacuum. The metal chlorides were hydrolyzed by soaking the impregnated porous graphite in water. The hydrolyzed precursor was then dehydrated in an electrothermal atomizer to dry the metal hydroxide and then heated to form the carbide.

Such a process required the time consuming steps of hydrolyzing by soaking in water (for 24 hours) and heating (for 2 hours) to dehydrate the metal hydroxide. Further, such a process resulted in extensive oxide formation. Most notably, only porous substrates could be impregnated by such a process.

SUMMARY OF THE INVENTION

According to the present invention a carbide phase is formed on a porous or impervious carbon substrate via a method providing for maximum binding between the carbide and the carbon substrate. The carbide formed on the carbon substrate is provided by chemically reacting the substrate with a concentrated solution of a carbide forming element in compound dissolved in a suitable solvent. The carbon substrate is heated to a temperature at which the compound decomposes and chemically reacts with the porous or impervious carbon substrate to form the desired carbide phase.

In further accord with the present invention a simple method for chemically reacting the porous or impervious carbon substrate with carbide is carried out rapidly in an inert gas at atmospheric pressure without expensive, elaborate gas tight ovens or induction furnaces.

Features of the invention include rapidly and inexpensively forming a carbide on a porous or impervious carbon substrate. A carbide on a carbon substrate results which is better suited for applications involving elevated temperatures because of reduced susceptibility to damage from thermal expansion and contraction. Still further, carbon substrates such as dense surface layers of pyrolytic graphite are reacted rapidly and inexpensively.

DETAILED DESCRIPTION OF THE INVENTION

Typically, non-porous graphite may be used to reinforce or strengthen polymer-matrix, metal-matrix and ceramic-matrix advanced composites. The graphite members may require a chemically inert barrier between themselves and the surrounding matrix, therefore it is desirable to select a carbide forming element or metal which is suitable to the ultimate environment, as is known in the art.

A robust barrier of adhesive carbide formed on the carbon substrate can be effected by chemically reacting the substrate with a concentrated solution of a carbide forming element in compound dissolved in a suitable solvent such as methanol or ethanol. Other solvents, as known in the art, may be preferred depending on the element in compound to be admixed.

The quantity of carbide forming element comprising the carbide phase is controlled by adjusting the concentration of the element in compound/solvent solution. The carbon substrate is usually immersed into or drawn through the carbide forming element in compound/solvent solution. However, depending on the viscosity of the element in compound/solvent solution, the carbon substrate may be "painted" with the solution. Following application of the solution containing the carbide forming element, the solvent is allowed to evaporate and the carbon substrate is heated by passing an electric current through the substrate, by leads attached at extreme ends. The substrate is heated in an inert atmosphere to a temperature at which the element in compound decomposes and the carbide forming element chemically reacts with the carbon substrate. The reaction temperature to which the substrate must be heated depends upon the carbide forming element selected. The carbides that are formed may incorporate a part or all of the carbon substrate in their structure. Therefore, they are chemically bonded to the substrate.

The immersion/solvent evaporation/high temperature chemical reaction sequence resembles that used in sol-gel processes for coating substrates. However, in contrast to a sol-gel process, the high temperature chemical reaction according to the invention includes the carbon substrate as one of the reactants. One of ordinary skill in the art may appreciate that like a sol-gel process, the thickness of the carbide phase could be controlled by operational parameters such as speed of withdrawal from the precursor solution, concentration, viscosity and surface tension of the solution, and the angle of withdrawal.

The following examples of forming carbide coatings of niobium, tantalum, tungsten, vanadium, hafnium and zirconium are provided for the purpose of illustration.

EXAMPLES

1. A solution of niobium pentachloride in 95% ethanol at a concentration of 1 gram/mL was prepared. A three-inch long section of spectroscopic graphite electrode rod (Bay Carbon, Bay City, Mich., Type L-3807, Grade AGKSP, Lot No. 080390) was machined to give a rectangular surface with a width equal to the diameter of the rod (3/16 inch) and 0.5 inch long in the middle of the rod. The rod was inserted through a boron nitride cell, and the ends of the rod were connected to a high current source (9 amp maximum) of electrical power (Varian Instruments, Palo Alto, Calif., Model CRA-63 carbon rod atomizer). A stream of argon gas flowed through the cell at a rate of one liter per minute to provide an inert atmosphere around the rectangular surface. The rectangular surface of the rod was completely covered with an aliquot of the niobium pentachloride solution. The rod was resistively heated to approximately 400° C. over 30 seconds and to a final temperature of 2900° C. for six seconds. Additional aliquots of solution were applied to the rectangular surface and the reaction cycle was repeated three times.

2. A 0.5 inch long by 3/16 inch wide rectangular surface was machined in the middle of a three-inch long rod of spectroscopic graphite as described in Example 1. The surface was coated with a pyrolytic graphite layer by resistively heating it to about 2000° C. for 12 seconds while a gas mixture of 5% propane and 95% argon flowed across it. The pyrolyzed surface was then coated with a 1 g/mL solution of niobium pentachloride in 95% ethanol. The surface was resistively heated to approximately 400° C. over 20 seconds and then to 2900° C. for six seconds in the cell and using the electrical power supply described in Example 1. Additional coats of niobium pentachloride solution were applied to the surface and the reaction cycle was repeated three times.

3. A solution of niobium pentachloride in 95% ethanol at a concentration of 1 gram/mL was prepared. A 25 µL aliquot was applied to the surface of a rectangular wafer (2.5 mm wide×5 mm long) of pyrolytic graphite using a micropipette. The wafer was placed within a graphite tube with an internal diameter of 3 mm that was resistively heated to approximately 400° C. for 20 seconds and to a final temperature of 2900° C. for six seconds in the cell and using the electrical power supply described in Example 1. An additional 25 µL aliquot was applied to the surface of the wafer and the reaction cycle was repeated.

4. A solution of vanadium pentachloride was prepared in 95% ethanol at a concentration of 0.25 g/mL. A 0.5 inch long by 3/16 inch wide rectangular surface was machined in the middle of a 3 inch long rod of spectroscopic graphite as described in Example 1. The surface was coated with the solution of vanadium pentachloride. The surface was resistively heated in an argon atmosphere to approximately 400° C. over 20 seconds and then to 2900° C. for 6 seconds in the cell and using the electrical power supply described in Example 1. Additional coats of vanadium pentachloride were applied to the surface and the reaction cycle was repeated 3 times.

5. A solution of tungsten hexachloride was prepared in methanol at a concentration of 0.25 g/mL. A 0.5 inch long by 3/16 inch wide rectangular surface was machined in the middle of a 3 inch long rod of spectroscopic graphite as described in Example 1. The surface was coated with the solution of tungsten hexachloride. The surface was resistively heated in an argon atmosphere to approximately 400° C. over 20 seconds and then to 2900° C. for 6 seconds in the cell and using the electrical power supply described in Example 1. Additional coats of tungsten hexachloride were applied to the surface and the reaction cycle was repeated 3 times.

6. A solution of hafnium tetrachloride was prepared in methanol at a concentration of 0.25 g/mL. A 0.5 inch long by 3/16 inch wide rectangular surface was machined in the middle of a 3 inch long rod of spectroscopic graphite as described in Example 1. The surface was coated with the solution of hafnium tetrachloride. The surface was resistively heated in an argon atmosphere to approximately 400° C. over 20 seconds and then to 2900° C. for 6 seconds in the cell and using the electrical power supply described in Example 1. Additional coats of hafnium tetrachloride were applied to the surface and the reaction cycle was repeated 3 times.

7. A solution of zirconium tetrachloride was prepared in 95% ethanol at a concentration of 0.25 g/mL. A 0.5 inch long by 3/16 inch wide rectangular surface was machined in the middle of a 3 inch long rod of spectroscopic graphite as described in Example 1. The surface was coated with the solution of zirconium tetrachloride. The surface was resistively heated in an argon atmosphere to approximately 400° C. over 20 seconds and then to 2900° C. for 6 seconds in the cell and using the electrical power supply described in Example 1. Additional coats of zirconium tetrachloride were applied to the surface and the reaction cycle was repeated 3 times.

8. A solution of tantalum pentachloride was prepared in methanol at a concentration of 0.25 g/mL. A 0.5 inch long by 3/16 inch wide rectangular surface was machined in the middle of a 3 inch long rod of spectroscopic graphite as described in Example 1. The surface was coated with the solution of tantalum pentachloride. The surface was resistively heated in an argon atmosphere to approximately 400° C. over 20 seconds and then to 2900° C. for 6 seconds in the cell and using the electrical power supply described in Example 1. Additional coats of tantalum pentachloride were applied to the surface and the reaction cycle was repeated 3 times.

Although concentrated solutions comprising salts forming carbides of the elements niobium, tantalum, tungsten, vanadium, hafnium and zirconium are discussed hereinbefore relative to the method of forming a carbide phase according to the invention, one of ordinary skill in the art will appreciate that other elements in compound may be used to form respective carbide phases.

Although the carbide forming elements in compound discussed hereinbefore are dissolved in ethanol or methanol it can be appreciated by one of ordinary skill in the art that other suitable solvents may be used to form a carbide phase according to the invention.

While electrothermal heating of the carbon substrate is discussed, other means of localized heating of the carbon substrate to decompose the carbide forming elements in compound thereon without the use of an induction furnace could be implemented, such as radiant heating.

Although the invention has been shown and described with respect to illustrative examples, thereof, it should be understood by those skilled in the art that the foregoing and various other changes, omissions and additions in the form and detail thereof may be made without departing from the spirit and scope of the invention as delineated in the claims.

What is claimed is:

1. A carbide formed on a carbon substrate by a process comprising the steps of:

selecting a carbide forming element in the form of a carbon-free metal salt;

dissolving substantially only said carbide forming element in a non-aqueous solvent;

depositing said non-aqueous solvent having said carbide forming element dissolved therein onto said carbon substrate;

heating said carbon substrate to temperatures at which said carbon-free metal salt decomposes and chemically reacts only with said carbon substrate to form a carbide phase thereon.

2. The carbide formed on a carbon substrate of claim 1 wherein said carbon substrate is a porous graphite member.

3. The carbide formed on a carbon substrate of claim 1 wherein said carbon substrate is an impervious carbon member.

4. The carbide formed on a carbon substrate of claim 1 wherein said carbide forming element is a carbon-free salt of a metal selected from the group consisting of niobium, tantalum, vanadium, hafnium and zirconium.

5. The carbide formed on a carbon substrate of claim 1 wherein said solvent is ethanol.

6. The carbide formed on a carbon substrate of claim 1 wherein said solvent is methanol.

7. The carbide formed on a carbon substrate of claim 1 wherein said step of heating is achieved by passing an electric current through said carbon substrate.

8. The carbide formed on a carbon substrate of claim 1 wherein said step of heating is achieved by radiant heating.

9. The carbide formed on a carbon substrate of claim 1 wherein the steps of dissolving, depositing and heating are carried out in an inert gas at atmospheric pressure.

10. A carbide formed on a substrate comprising carbon uncombined with other elements, said carbide formed by a process comprising the steps of:

selecting a single carbide precursor compound comprising a carbide forming element in the form of a carbon free metal salt;

dissolving said carbide forming element in a non-aqueous solvent;

depositing said solvent having said carbide forming element dissolved therein onto said carbon substrate:

heating said carbon substrate to temperatures at which said carbon-free metal salt decomposes and chemically reacts only with said uncombined carbon in said substrate to form a carbide phase thereon.

* * * * *